United States Patent
Zink et al.

(10) Patent No.: US 8,167,762 B2
(45) Date of Patent: May 1, 2012

(54) DRIVE AXLE ASSEMBLY WITH WHEEL SPEED MEASUREMENT SYSTEM

(75) Inventors: Frederick E. Zink, Capac, MI (US); Jeffrey L. Gerstenberger, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 412 days.

(21) Appl. No.: 12/429,827

(22) Filed: Apr. 24, 2009

(65) Prior Publication Data

US 2010/0272380 A1    Oct. 28, 2010

(51) Int. Cl.
  *F16H 48/06*    (2006.01)
(52) U.S. Cl. ......................................... 475/230
(58) Field of Classification Search .................. 475/230, 475/231, 248, 249
  See application file for complete search history.

(56) References Cited

U.S. PATENT DOCUMENTS

| | | | |
|---|---|---|---|
| 3,138,970 A | 6/1964 | Costa et al. | |
| 3,719,841 A | 3/1973 | Ritsema | |
| 3,769,533 A | 10/1973 | Pauwels | |
| 3,949,841 A | 4/1976 | Jovick et al. | |
| 4,090,592 A | 5/1978 | Jovick et al. | |
| 4,793,211 A | 12/1988 | Schmidt | |
| 4,862,025 A | 8/1989 | Dierker, Jr. et al. | |
| 4,862,028 A | 8/1989 | Dierker, Jr. et al. | |
| 4,893,075 A | 1/1990 | Dierker, Jr. | |
| 4,937,522 A | 6/1990 | Gee | |
| 4,953,670 A | 9/1990 | Chemelewski | |
| 5,067,350 A | 11/1991 | Grillo et al. | |
| 5,215,506 A | 6/1993 | Hara | |
| 5,223,760 A | 6/1993 | Peck et al. | |
| 5,227,719 A | 7/1993 | Peterson et al. | |
| 5,336,995 A | 8/1994 | Caron | |
| 5,486,757 A * | 1/1996 | Easley ........................... | 324/174 |
| 5,503,250 A | 4/1996 | Schantz et al. | |
| 6,549,001 B1 | 4/2003 | Dobbs et al. | |
| 6,664,780 B2 | 12/2003 | Dobbs et al. | |
| 6,957,918 B2 | 10/2005 | Beutler et al. | |
| 7,108,428 B2 | 9/2006 | Ason et al. | |
| 7,233,138 B2 * | 6/2007 | Michalek et al. ............. | 324/173 |
| 7,345,469 B2 * | 3/2008 | Swansno ........................ | 324/174 |
| 7,878,059 B2 * | 2/2011 | Campbell ........................ | 73/488 |
| 2007/0251319 A1 * | 11/2007 | Campbell ........................ | 73/488 |

FOREIGN PATENT DOCUMENTS

EP    0599179 A1    6/1994

OTHER PUBLICATIONS

Extended Search Report from European Patent Office in Co-pending Application No. 10250795.

* cited by examiner

*Primary Examiner* — Justin Holmes
*Assistant Examiner* — Huan Le
(74) *Attorney, Agent, or Firm* — Harness, Dickey & Pierce, P.L.C.

(57)    ABSTRACT

A wheel speed measurement system for a drive axle is provided within a differential assembly. The system includes a differential side bearing adjustment ring configured for adjusting the position of a differential carrier bearing assembly. A tone ring is provided having an inner bore to accommodate a coaxial axle shaft. A retainer ring member is snap-fit between the differential side bearing adjustment ring and the tone ring, permitting relative rotation of the tone ring. Sensors are provided in sensor mounts integrally formed on an exterior of a differential assembly housing.

13 Claims, 7 Drawing Sheets

DRIVE AXLE ASSEMBLY WITH WHEEL SPEED MEASUREMENT SYSTEM

FIELD

The present disclosure relates to vehicle axles and more particularly to a wheel speed sensor and measurement system for a vehicle drive axle.

BACKGROUND

This section provides background information related to the present disclosure which is not necessarily prior art.

Modern vehicles typically include an axle assembly having a housing and a differential assembly. The housing includes a cavity into which the differential assembly is positioned. The differential assembly is rotatably supported by the housing within the cavity. The differential assembly is mechanically coupled to the vehicle engine by a drive shaft. The differential assembly is also coupled to the vehicle drive wheels via a pair of axle shafts. The differential assembly regulates drive torque between the axle shafts, thereby permitting the shafts to rotate at different velocities as when one of the drive wheels is slipping or when the vehicle is turning.

Modern automotive vehicles frequently include systems, such as ABS, traction, and stability control systems, that identify wheel slip conditions and responsively control the vehicle (e.g., engine, transmission, braking system) to reduce or eliminate wheel slip in certain instances. In such systems, a sensor is typically employed to sense the speed of a wheel or another component, such as the axle shaft, that has the rotational speed of the wheel.

Typically, wheel speed sensors have been installed at the axle shaft ends nearest to the wheels. While such arrangements are suited for their intended purpose, they are nonetheless susceptible to improvement. For example, an arrangement that does not employ a forged or sintered metal sensor mounting boss would eliminate a part, eliminate a welding process, and reduce assembly time. Accordingly, while typical wheel speed sensing assemblies may perform adequately, a need exists for an improved drive axle assembly and wheel speed measurement system that is less complex, provides for easier installation, and results in accurate measurement of actual wheel speed.

SUMMARY

This section provides a general summary of the disclosure, and is not a comprehensive disclosure of its full scope or all of its features.

In one form, the present teachings provide a wheel speed measurement system for a drive axle. The wheel speed measurement system can include a differential side bearing adjustment ring, a tone ring a retainer ring member and a sensor. The differential side bearing adjustment ring is configured for adjusting the position of a differential carrier bearing assembly. The tone ring has a radial flange protruding about a circumference of an end of an axially extending portion. The tone ring defines a plurality of alternating teeth and gaps. An inner bore for accommodating a coaxial axle shaft is formed through the tone ring. The retainer ring member axially couples both the differential side bearing adjustment ring and the tone ring. The sensor includes a tip portion that is disposed in proximity to the tone ring and generates a sensor signal in relation to the teeth and gaps on the tone ring.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Such embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

When an element or layer is referred to as being "on", "engaged to", "connected to" or "coupled to" another element or layer, it may be directly on, engaged, connected or coupled to the other element or layer, or intervening elements or layers may be present. Although the terms such as "first," "second," and other numerical terms may be used herein to describe various elements, components, regions, and/or sections, these elements, components, regions, and/or sections should not be limited by these terms. These terms may be only used to distinguish one element, component, region, or section from another region or section.

Figure 1:
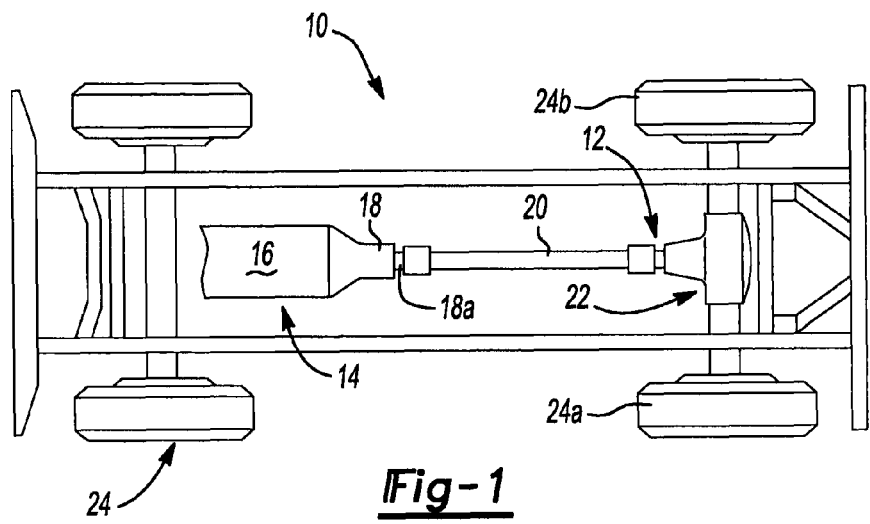
FIG. 1 is a schematic illustration of an exemplary vehicle having a wheel speed measurement system constructed in accordance with the teachings of the present disclosure.

With reference to FIG. 1 of the drawings, a vehicle having an axle assembly that is constructed in accordance with the teachings of the present disclosure is generally indicated by reference numeral 10. The vehicle 10 may include a driveline 12 drivable via a connection to a power train 14. The power train 14 typically includes an engine 16 and a transmission 18. As shown, the driveline 12 may include a propshaft assembly 20, a rear axle assembly 22, and a plurality of wheels 24. The engine 16 is shown mounted in an in-line or longitudinal orientation along the axis of the vehicle 10 and its output is selectively coupled via a conventional clutch to the input of the transmission 18 to transmit rotary power (i.e., drive torque) therebetween. The input of the transmission 18 is commonly aligned with the output of the engine 16 for rotation about a rotary axis. The transmission 18 may include an output 18a and a gear reduction unit (not shown). The gear reduction unit is operable for coupling the transmission input to the output 18a of the transmission at a predetermined gear speed ratio. The propshaft assembly 20 is coupled for rotation with the output 18a of the transmission 18. Drive torque is transmitted through the propshaft assembly 20 to the rear axle assembly 22 where it may be selectively apportioned in a predetermined manner to the left and right rear wheels 24a and 24b, respectively.

Figure 2:
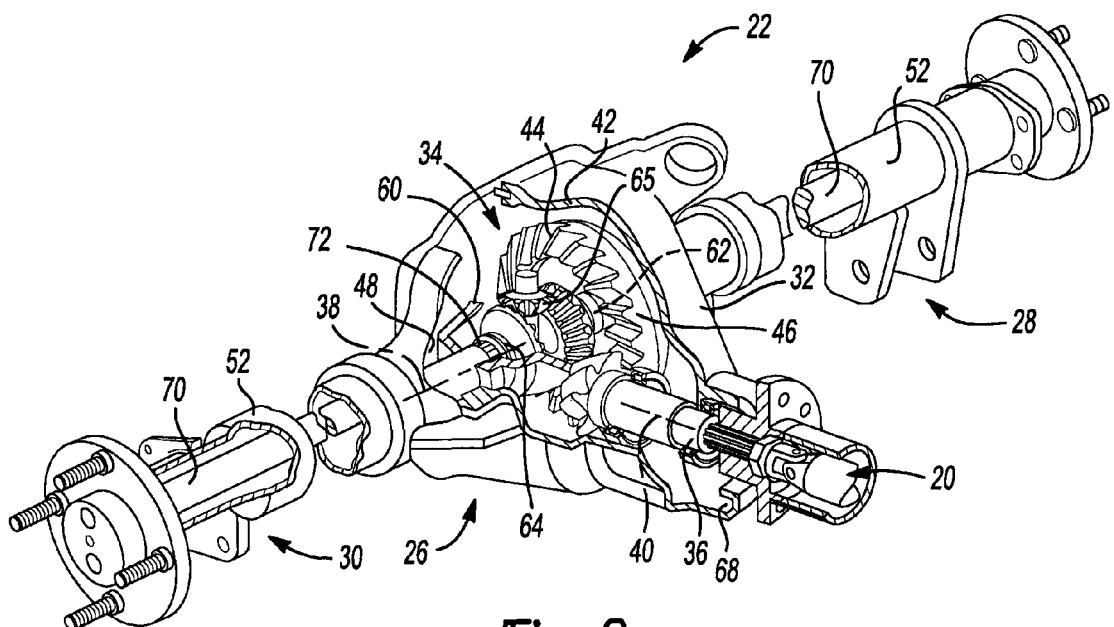
FIG. 2 is a partially cut away perspective view of a portion of the vehicle of FIG. 1 illustrating an exemplary rear axle assembly and propshaft in greater detail.

With additional reference to FIG. 2, the rear axle assembly 22 is shown to include a differential assembly 26, a left axle shaft assembly 28 and a right axle shaft assembly 30. The differential assembly 26 includes a housing 32, a differential unit 34 and an input shaft assembly 36. The housing 32 supports the differential unit 34 for rotation about a first axis 38 and further supports the input shaft assembly 36 for rotation about a second axis 40 that is perpendicular to the first axis 38.

The housing 32 may include a wall member 42 that defines a central cavity 44 having a first axle aperture 46, a second axle aperture 48, and an input shaft aperture 68. The housing 32 may further include, or be coupled to, a pair of axle tubes 52 that are fixedly mounted to the wall member 42. For example, an axle tube 52 may be mounted within an interior region 46a (FIG. 3) of the first axle aperture 46.

The differential unit 34 is disposed within the central cavity 44 of the housing 32 and includes a gearset 60. The gearset 60 includes first and second side gears 62 and 64, respectively, and a plurality of pinions 65. The left and right axle shaft assemblies 28 and 30 extend through the first and second axle apertures 46 and 48, respectively, where they are coupled for rotation about the first axis 38 with the first and second side gears 62 and 64, respectively.

The input shaft assembly 36 extends through the input shaft aperture 68 where it is supported in the housing 32 for rotation about the second axis 40. The input shaft assembly 36 is coupled for rotation with the propshaft assembly 20 and is operable for transmitting drive torque to the differential unit 34. More specifically, the drive torque received by the input shaft assembly 36 is transmitted to the differential unit 34 such that drive torque is distributed to the first and second side gears 62 and 64, causing the left and right axle shaft assemblies 28 and 30 to rotate about the first axis 38.

Each of the left and right axle shaft assemblies 28 and 30 may include an axle shaft 70 that is supported for rotation in an associated one of the axle tubes 52 about the first axis 38. Each of the axle shafts 70 may include an externally splined portion 72 that may meshingly engage a mating internally splined portion (not specifically shown) that is formed into the first and second side gears 62 and 64, respectively.

Figure 3:
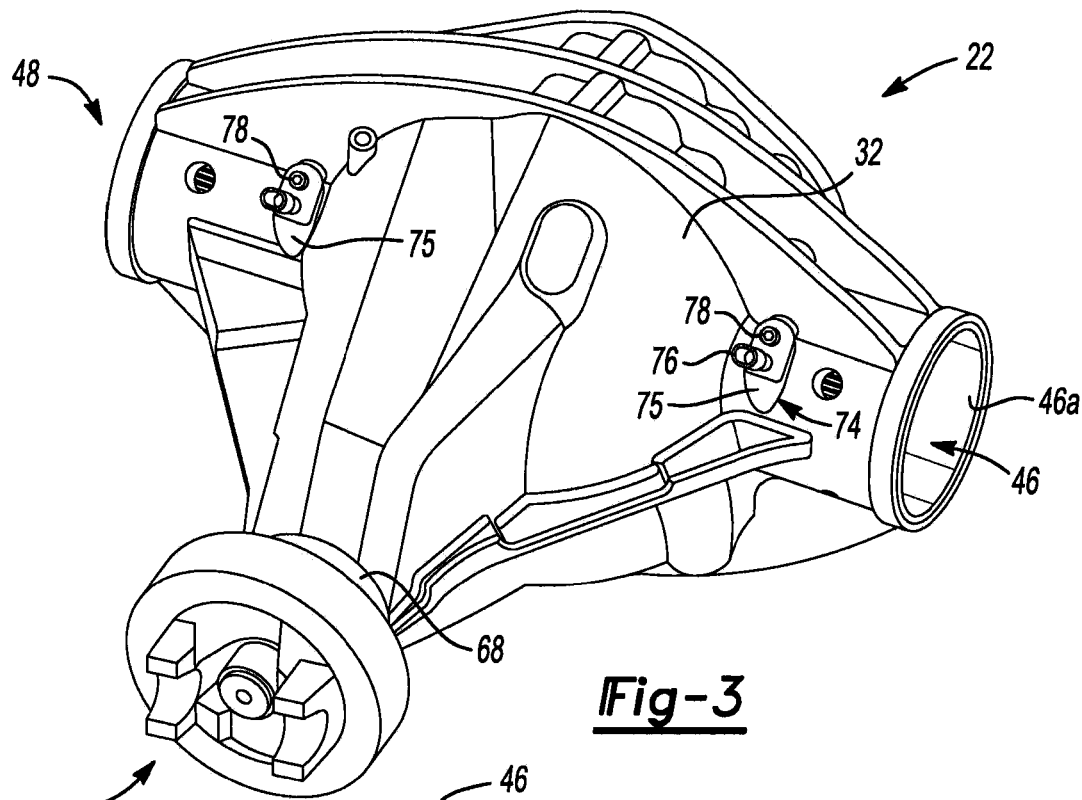
FIG. 3 is a front perspective view of a portion of the rear axle assembly.
Figure 4:
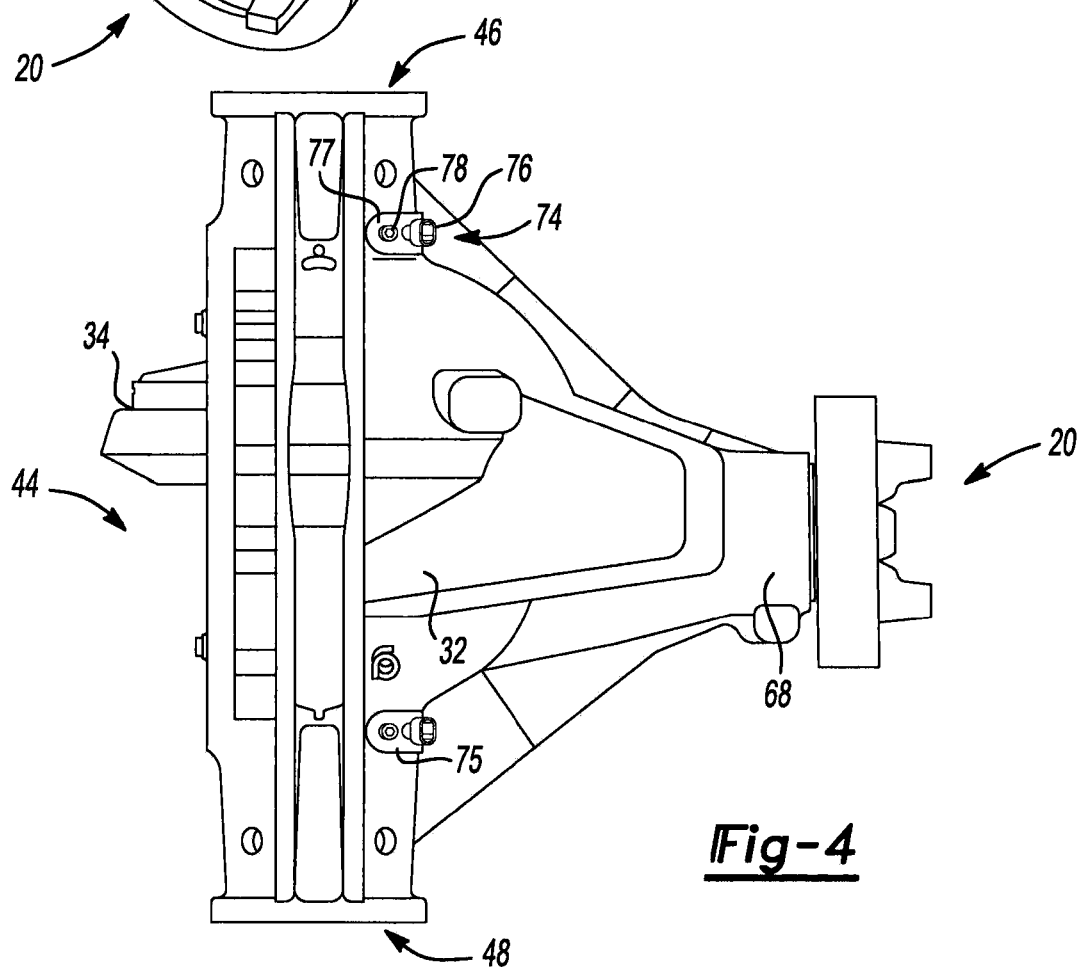
FIG. 4 is a top plan view of the portion of the differential assembly illustrated in FIG. 3.
Figure 5:
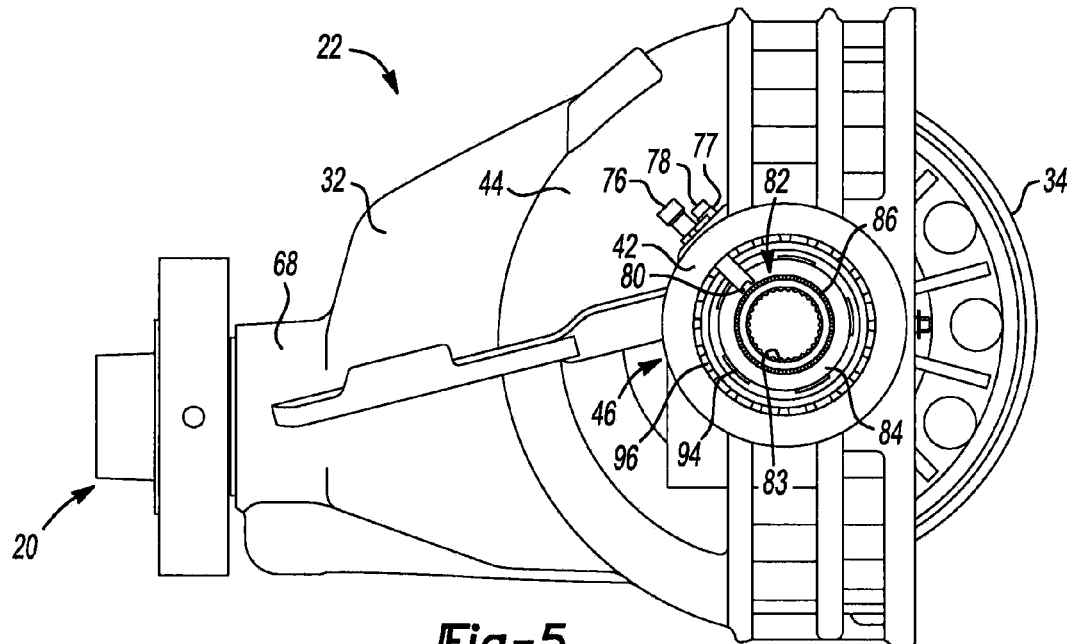
FIG. 5 is a side elevation view of the portion of the rear axle assembly illustrated in FIG. 3.

With reference to FIGS. 3 through 5, the rear axle assembly can include a wheel speed measurement system having a pair of wheel speed measurement assemblies 74. Each of the wheel speed measurement assemblies 74 may include an integral sensor mount 75, which can be cast or formed on an exterior of the housing 32, and a sensor 76. As shown, the integral sensor mounts 75 may be disposed on the housing 32 between the central cavity 44 portion and the first and second axle apertures 46, 48. It will be appreciated that the sensor mounts 75 can be positioned in a desired location that may be different from that which is illustrated in the accompanying drawings and described herein. For example, the sensor mounts 75 could be rotated about the first axis 38 (FIG. 2) to a location where they would be protected by gussets or other structure formed on the housing 32 (FIG. 2).

The sensor 76 may include a flange portion 77 configured to mate with the integral sensor mount 75. The flange portion 77 may be secured to the integral sensor mount 75 using a mechanical fastener 78, or screw. Such integration of the wheel speed measurement assemblies 74 within the differential assembly allows the various components to be contained inside a sealed environment. This sealed environment may further serve to protect the wheel speed measurement assemblies, making them less vulnerable to potential damage, contamination and/or corrosion.

Figure 6:
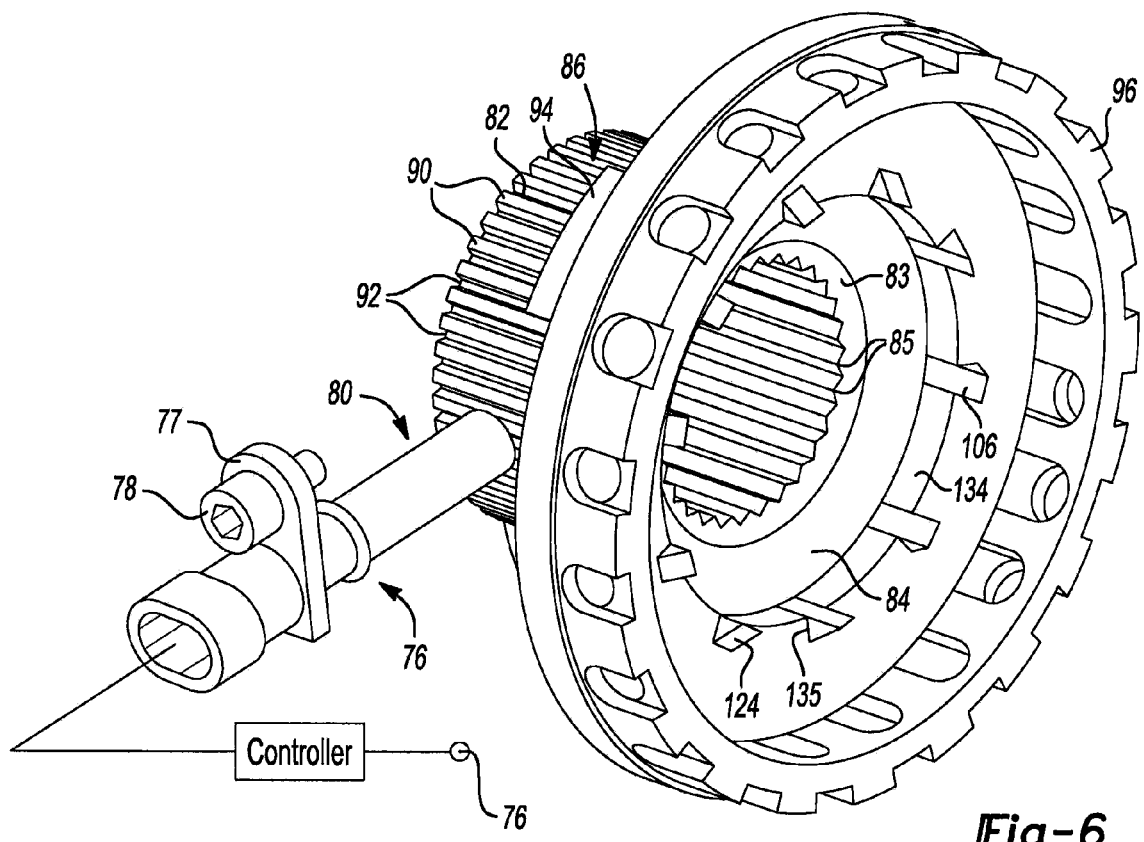
FIG. 6 is a perspective view of a portion of the rear axle assembly illustrating the wheel speed measurement assembly.

With reference to FIGS. 5 and 6, the sensor 76 is secured to the integral sensor mount 75 via the fastener 78 such that the inner end, or tip portion 80, of the sensor passes through an aperture of the wall member 42 of the housing 32 between the central cavity 44 and the first axle aperture 46 of the housing 32. In this manner, the tip portion 80 of the sensor 76 is in proximity to a tone ring 82. The tone ring 82 may comprise a steel member defining an inner bore 83 through which the axle shaft 70 can extend. The tone ring 82 can be coupled to the axle shaft 70 for rotation therewith. The tone ring 82 may be a generally tubular shaped member manufactured having a radial flange 84 protruding about the circumference of a first end 88 of a generally axially extending portion 86. The axially extending portion 86 is typically provided with a predetermined quantity of high and low points (i.e., teeth 90 and gaps 92, respectively) that are configured to cooperate with the sensor 76 to generate a sensor signal, which can be employed to calculate a rotational speed of the wheel to which the axle shaft 70 is coupled. In the particular example provided, the teeth 90 and gaps 92 are formed on a radial face of the tone ring 82 so as to extend in an axial direction parallel to a rotational axis about which the tone ring 82 is mounted. Accurately formed tone rings 82 can be desirable in some situations because relatively small differences on the radial positioning of the surface of the teeth 90 relative to the rotational axis of the axle shaft 70 (e.g., runout of the portion of the teeth 90 that is sensed by the sensor 76, which is the outer circumferential surface of the teeth 90 in the example provided) can affect the sensor signal that is produced by the sensor 76. Accordingly, it would be desirable to net-form the tone ring 82 in an accurate and repeatable manner, such as via powered metal that has been compressed in a die and sintered.

Figure 9:
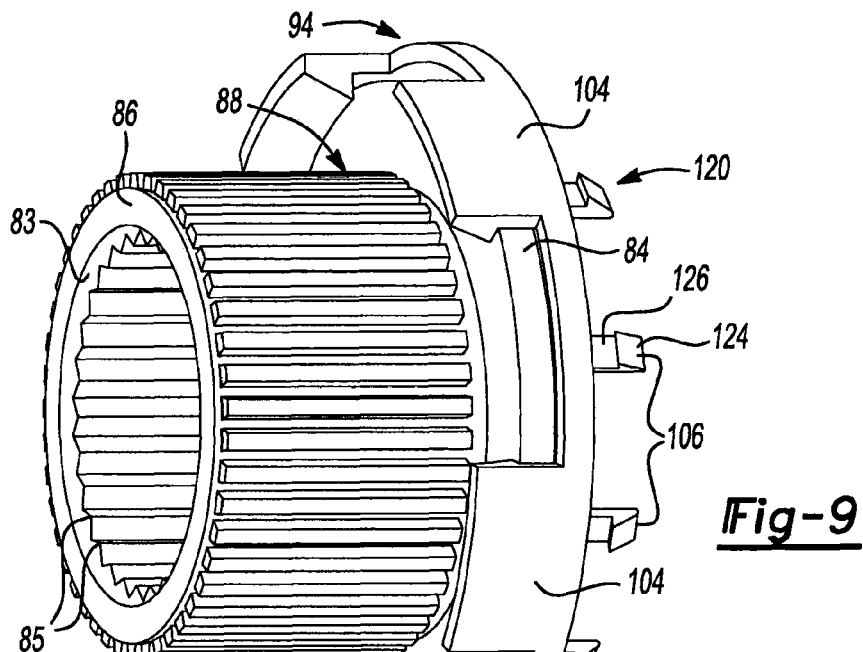
FIG. 9 is a perspective view of a portion of the wheel speed measurement assembly illustrating the retainer member coupled to a tone ring.

Various wheel speed sensors known to those skilled in the art may be used with the teachings of the present disclosure. One non-limiting example is a variable-reluctance wheel speed sensor. At the center of a variable-reluctance wheel speed sensor is a small internal permanent magnet and coil of thin copper wire wrapped around the magnet (details not shown). With reference to FIGS. 6 and 9, tone ring 82 is provided with a plurality of teeth 90 and alternating gaps 92.

Sensor 76, also shown in FIG. 6, detects the presence or absence of teeth 90 as tone ring 82 rotates around the rotational axis of the axle shaft 70 (i.e., first axis 38 in FIG. 2) and responsively generates a sensor signal. The teeth 90 can be spaced as desired, such as equally spaced, around the circumference of tone ring 82.

The sensors 76 can output a sensor signal indicative of the rotational speed of the tone ring 82; the sensor signal can be received by a controller C. The controller C can interpret the sensor signals as being related to the rotational speed of an associated one of the rear wheels 24a, 24b (FIG. 2). The controller C can calculate or determine various rotational parameters of tone rings 82, such as their rotational speed and acceleration, and the rotational parameters can be employed in other vehicle systems, such as an anti-locking brake system, traction control system, torque modulating four-wheel drive system or other systems that require vehicle or wheel speed. An exemplary controller C is described in U.S. Pat. No. 5,332,060, the specification and drawings of which are expressly incorporated by reference herein.

As known in the art, a larger diameter tone ring provides more teeth 90 which, in turn, provides increased accuracy in the measurement of rotational parameters. In addition, a larger diameter tone ring 82 enables larger teeth 90 and faster peripheral speed, both of which improve sensitivity of the system and enable increased manufacturing tolerances and reduced cost. As the signal produced by the sensors 76 can be affected by the distance between the tip portion 80 and the tone ring teeth 90, the distance between the end of the wheel speed tip portion 80 and the tone ring 82 should be predetermined in order to provide a suitable air gap necessary to provide a strong signal. As is known to those skilled in the art, if the air gap is too small, the wheel speed sensor and tone ring may contact each other with potentially damaging metal-to-metal contact therebetween. On the other hand, an excessive air gap may produce an unreliable or weak signal. The lower the deflection of the shaft, the less gap variation and the less the maximum gap, both of which provide for improved sensitivity.

Figure 10:
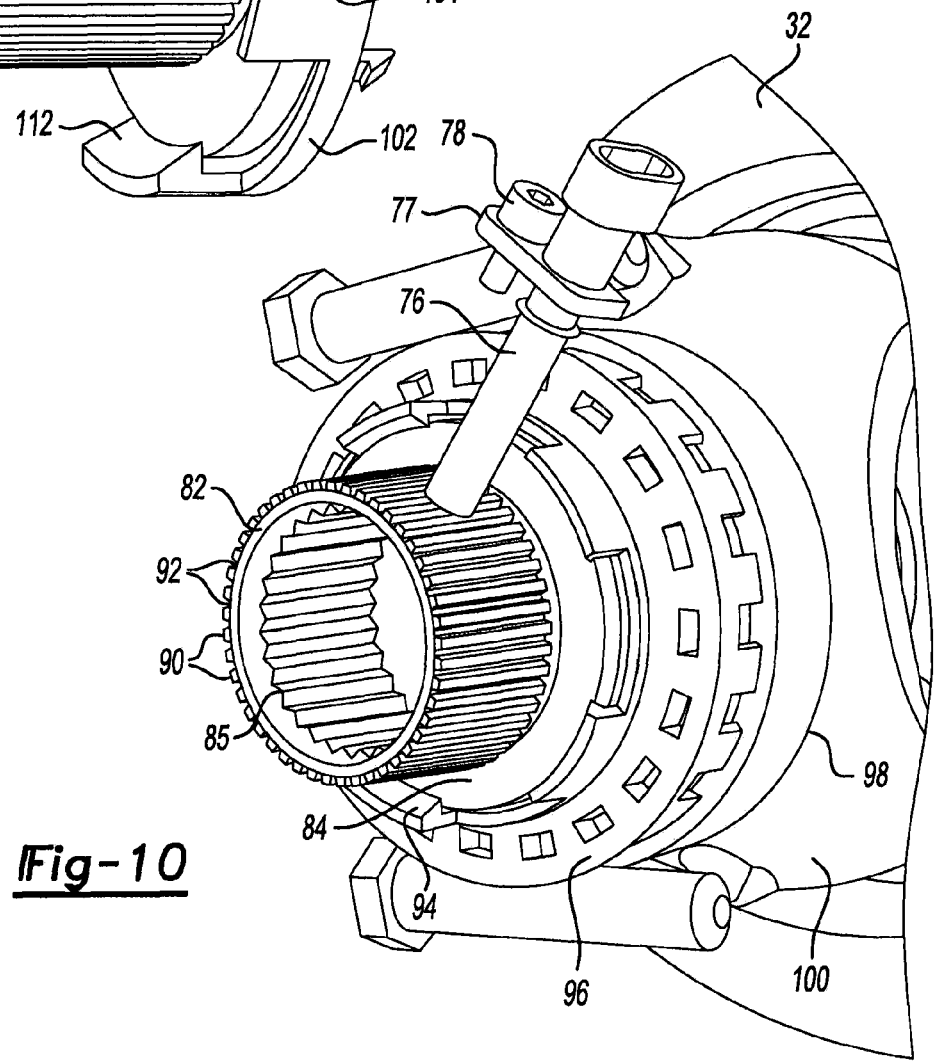
FIG. 10 is a perspective view of a portion of the rear axle assembly illustrating the wheel speed measurement assembly coupled to a differential case.

With renewed reference to FIGS. 5, 6 and 10, a retainer ring member 94 can couple the tone ring 82 and a differential side bearing adjustment ring member 96. As known to those skilled in the art, a differential side bearing adjustment ring member 96 is typically configured for adjusting the position of a differential carrier bearing assembly 98, which is coupled to a differential case 100.

Figure 11:
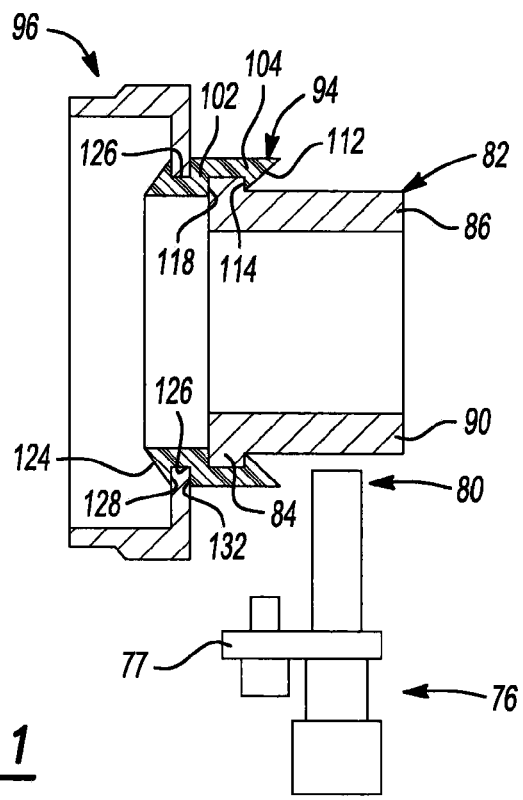
FIG. 11 is a longitudinal cross section of a portion of the rear axle assembly.

As best shown in FIGS. 6 and 11, a first end of the retainer ring member 94 can be snap-fit to the tone ring 82 while a second, opposite end of the retainer ring member 94 can be separately snap-fit to the bearing adjustment ring member 96. As shown in the example provided, the retainer ring member 94 is both axially coupled to an outer portion, or flange 84, of the tone ring 82 and an inner portion, or bore 134, of the differential bearing adjustment ring member 96. Such a coupling arrangement allows rotation of the tone ring 82 relative to the retainer ring member 94 and the bearing adjustment ring member 96 while maintaining the tone ring 82 at a predetermined axial spacing relative to the bearing adjustment ring member 96.

The retainer ring member 94 of the present disclosure may be formed of injection molded plastic. The use of an injection molded component allows for various complex shapes and designs to enable the snap-fit coupling. While only one design is shown, it should be understood that any suitable means of snap-fitting components may be used with the present disclosure.

Figure 7:
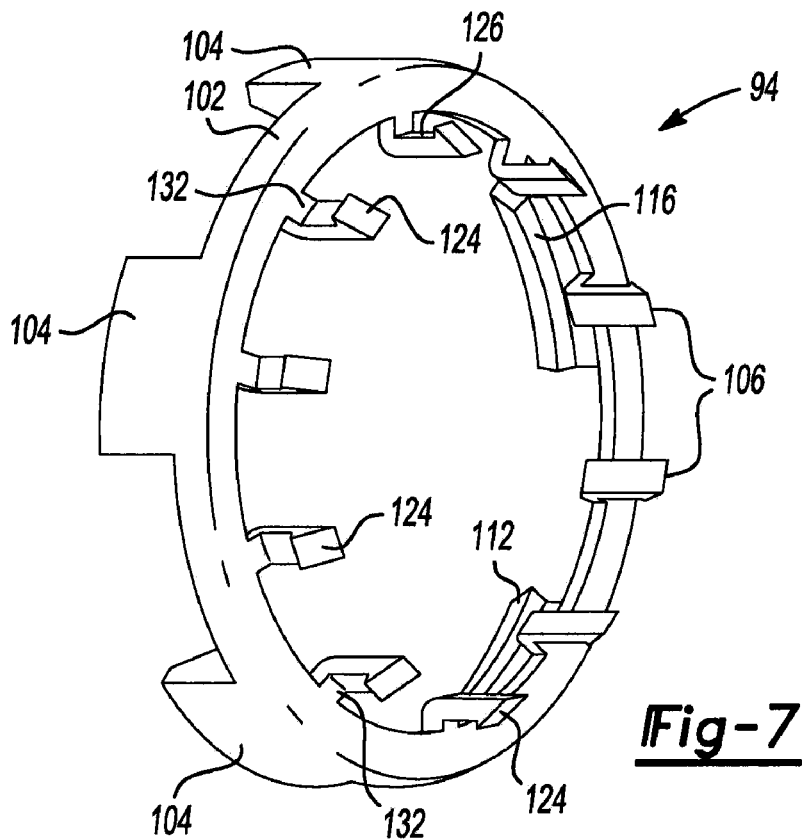
FIGS. 7 & 8 are perspective views of a portion of the wheel speed measurement assembly illustrating a retainer member.
Figure 8:
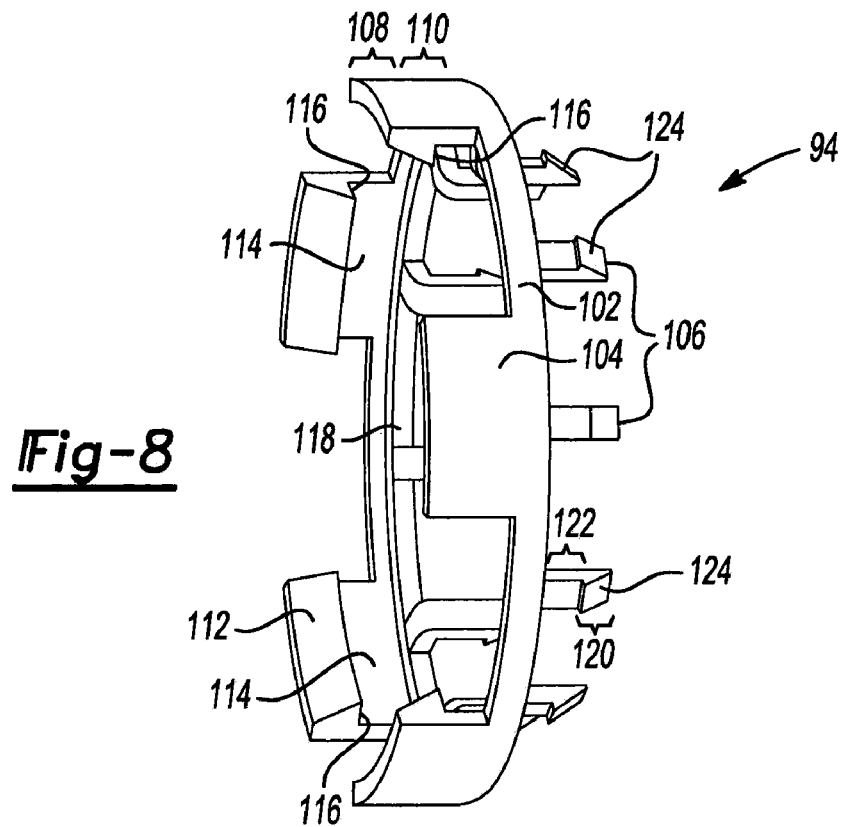

Details of the retainer ring member 94 can be seen in FIGS. 7 and 8. As shown, the retainer ring member 94 includes an annular center portion 102 and first and second sets, or pluralities, of integral prong members 104, 106 extending in opposite axial directions from the center portion 102. For example, the first set of prong members 104 may be configured to snap-fit with the tone ring 82. Such prong members 104 may include head portions 108 separated from the center portion 102 by axially extending stem portions 110. As shown, the head portions 108 are each formed with an inwardly angled face 112. Flange retaining areas 114 are provided between ends 116 of the head portions 108 and an edge 118 of the annular center portion 102. A plurality of flange retaining areas 114 are configured to cooperate with one another to removably secure, or snap-fit, the radial flange 84 of the tone ring 82. The flange retaining areas 114 are provided with enough clearance such that the tone ring 82 may freely rotate with respect to the retainer ring member 94.

The second set of prong members 106 may be configured to snap-fit with the bearing adjustment ring member 96. Similarly, the second set of prong members 106 may include head portions 120 separated from the center portion 102 by axially extending stem portions 122. The head portions 120 are each formed with an outwardly angled face 124. Bearing adjuster retaining areas 126 are provided between ends 128 of the head portions and an edge 130 of the annular center portion 132. A plurality of bearing adjuster retaining areas 126 are configured to cooperate with one another to removably secure, or snap-fit, the differential bearing adjuster ring 96. As best shown in FIG. 6, the differential bearing adjuster ring 96 defines an inner bore 134 that may be provided with a plurality of spaced cut-outs 135 operable for accepting the prongs 106 of the retainer ring member 82. Such an arrangement prevents rotational movement between the differential bearing adjustment ring member 96 and the retainer ring member 94.

Figure 12:
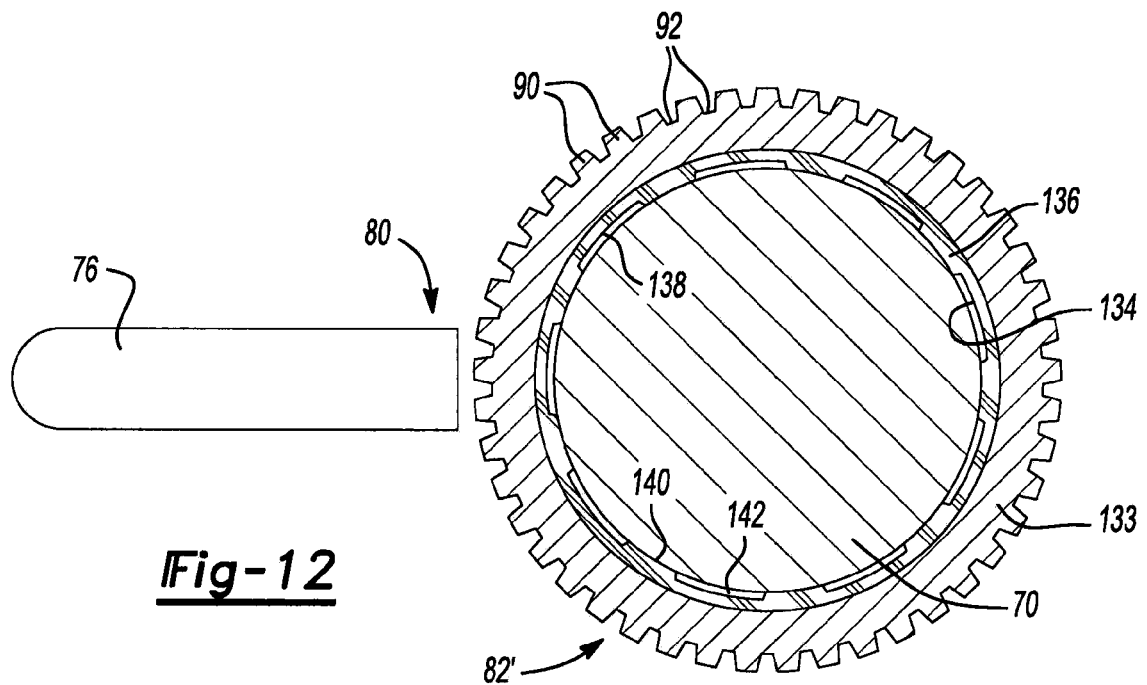
FIG. 12 is a lateral cross section of another tone ring constructed in accordance with the teachings of the present disclosure, the tone ring having an elastomer insert.

With reference to FIG. 12, an alternately constructed tone ring 82' is shown in cross section perpendicular to the axis of axle shaft 70. Rather than providing internal splines 85 (FIG. 6), tone ring 82 comprises a body 133 having an inner bore 134 into which an insert 136 is received and fixedly coupled to the body 133. An exemplary insert is described in U.S. Pat. No. 7,233,138, the specification and drawings of which are expressly incorporated by reference herein. Preferably, the insert 136 is of an elastomeric material. Elastomer insert 136 may be provided with channels 138 that are provided to enable oil flow between elastomer insert 136 and axle shaft 70. An interior surface 140 of elastomer insert 136 can be interference fit with axle shaft 70 to permit tone ring 82 to rotate with axle shaft 70.

Figure 13:
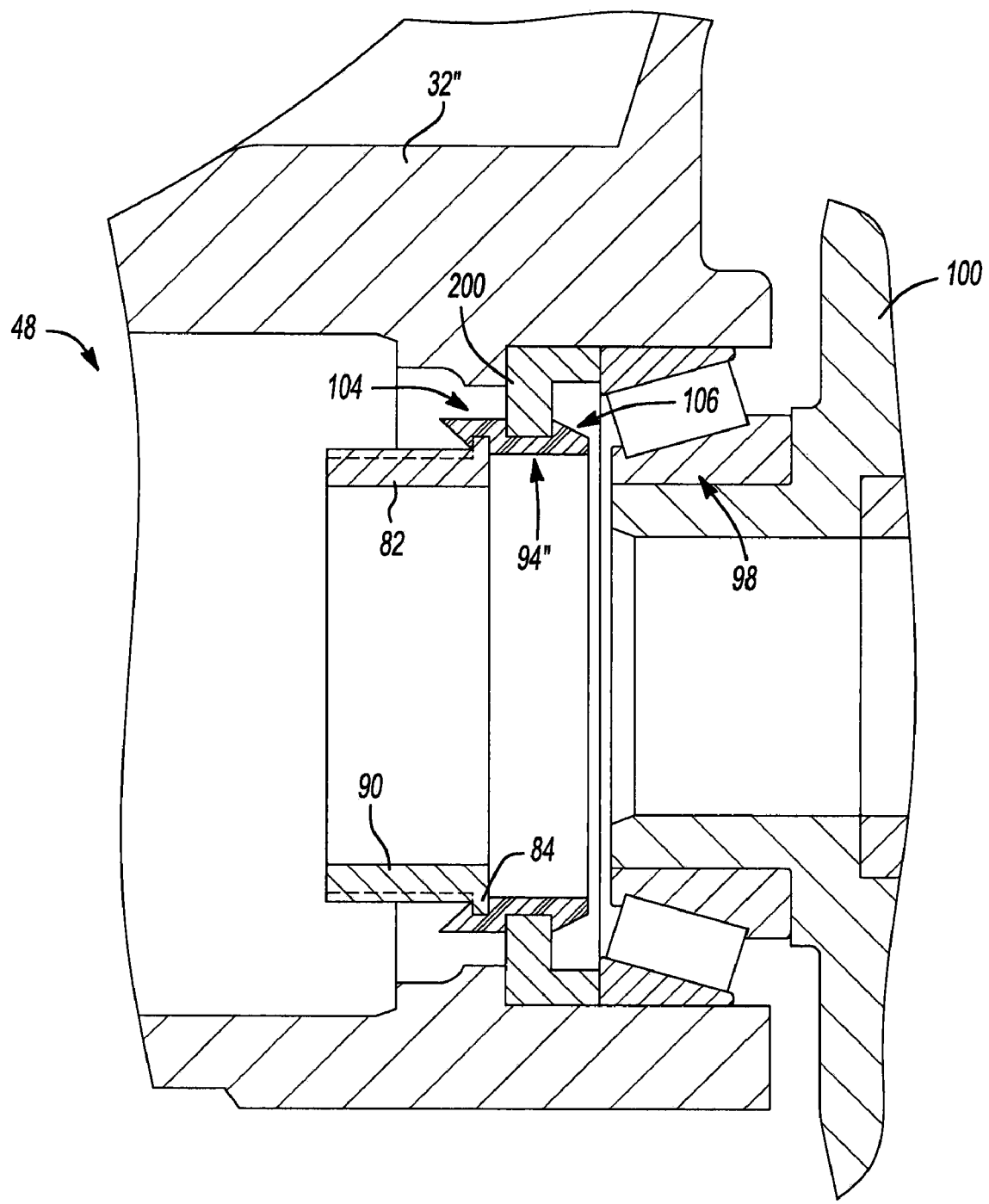
FIG. 13 is a section view of a portion of an axle assembly having another wheel speed measurement system constructed in accordance with the teachings of the present disclosure.

With reference to FIG. 13, another wheel speed measurement system constructed in accordance with the teachings of the present disclosure is illustrated. The wheel speed measurement system can be generally similar to that of FIGS. 1 through 11, except that the retainer ring member 94", which can be generally similar to retainer ring member 94 (FIG. 11), may be coupled directly to (e.g., snap-fit with) a differential bearing shim 200 that can be abutted against the housing 32" and the differential carrier bearing assembly 98". In the particular example provided, one end of retainer ring member 94" is snap-fit to the tone ring 82 while the other end of the retainer ring member 94" is separately snap-fit to differential bearing shim 200.

The present disclosure also relates a method of assembling a drive axle assembly having a wheel speed measurement system provided within a differential assembly. Exemplary methods include providing an axle housing 32 defining a central cavity 44 having a first axle aperture 46 and a second axle aperture 48. The axle housing 32 is formed having at least one integral sensor mount 75 on an exterior of the housing 32. The sensor mount 75 may be formed or cast on a surface between the central cavity 44 and at least one of the first axle aperture 46 and the second axle aperture 48. A differential unit 34 is installed and rotatably supported by a differential case 100 within the central cavity 44 of the axle housing 32. The method includes coupling an axle tube 52 to at least one of the first and second axle apertures 46, 48, and providing an axle shaft 70 rotatably coupled to the differential unit 34 and extending through the axle tube 52. A differential carrier bearing assembly 98 coupled to the differential case 100. A measurement system is provided having a differential side bearing adjustment ring member 96 disposed adjacent the differential carrier bearing assembly 98. A tone ring 82 having an internal bore 83 is placed over the axle shaft 70 in a coaxial manner. The method includes coupling both the differential side bearing adjustment ring member 96 and the tone ring 82 with a retainer ring member 94. A sensor 76 is inserted and secured to the integral sensor mount 75 such that a tip portion 80 of the sensor is in proximity to the tone ring 82.

In certain aspects, coupling both the differential side bearing adjustment ring member 96 and the tone ring 82 with a retainer ring member 94 includes separately snap-fitting the retainer ring member to an inner bore 134 of the differential side bearing adjustment ring member 96 and to the outer flange 84 of the tone ring 82.

The method steps, processes, and operations described herein are not to be construed as necessarily requiring their performance in the particular order discussed or illustrated, unless specifically identified as an order of performance. It is also to be understood that additional or alternative steps may be employed.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. An axle assembly comprising:
   an axle housing defining a central cavity and including an external sensor mount;
   a differential case received in the central cavity of the axle housing;
   a differential unit in the differential case, the differential unit including a pair of side gears;
   an axle tube coupled to the axle housing;
   an axle shaft coupled for rotation with one of the side gears, the axle shaft extending through the axle tube;
   a bearing supporting the differential case for rotation in the central cavity of the axle housing;
   a ring mounted in the axle housing;
   a tone ring defining an internal bore through which the axle shaft extends, the tone ring being coupled for rotation with the axle shaft;
   a retainer coupled to both the ring and the tone ring to maintain the tone ring at a predetermined axial spacing relative to the ring; and
   a sensor secured to the sensor mount and sensing the tone ring;
   wherein the retainer is separately snap-fit to the tone ring and to the ring to form an assembly.

2. The axle assembly of claim 1, wherein the retainer is formed of molded plastic.

3. The axle assembly of claim 1, wherein the internal bore of the tone ring defines a plurality of splines configured to engage corresponding splines disposed on the axle shaft.

4. The axle assembly of claim 1, wherein the axle housing defines a pair of axle apertures, and wherein the axle tube is separately formed from the axle housing and installed into one of the axle apertures.

5. The axle assembly of claim 1, wherein the retainer permits rotation of the tone ring relative to the ring and the retainer.

6. The axle assembly of claim 5, wherein the sensor mount is disposed between the central cavity and an axle aperture formed in the axle housing.

7. The axle assembly of claim 1, further comprising an insert disposed within the internal bore of the tone ring and contacting the axle shaft to restrain the relative motion between the tone ring and the axle shaft.

8. The axle assembly of claim 7, wherein the insert is formed of an elastomer.

9. An axle assembly comprising:
   an axle housing defining a central cavity and including an external sensor mount;
   a differential case received in the central cavity of the axle housing;
   a differential unit in the differential case, the differential unit including a pair of side gears;
   an axle tube coupled to the axle housing;
   an axle shaft coupled for rotation with one of the side gears, the axle shaft extending through the axle tube;
   a bearing supporting the differential case for rotation in the central cavity of the axle housing;
   a ring mounted in the axle housing;
   a tone ring defining an internal bore through which the axle shaft extends, the tone ring being coupled for rotation with the axle shaft;
   a retainer coupled to both the ring and the tone ring to maintain the tone ring at a predetermined axial spacing relative to the ring; and
   a sensor secured to the sensor mount and sensing the tone ring;
   wherein the retainer comprises a first set of prong members that are configured to snap-fit with the tone ring.

10. The axle assembly of claim 9, wherein the retainer further comprises a center portion and a second set of prong members, the first and second sets of prong members extending in opposite axial directions from the center portion, the second set of prong members configured to snap-fit with the ring.

11. The axle assembly of claim 9, wherein the tone ring includes a radial flange to which the first set of prong members are engaged.

12. An axle assembly comprising:
   an axle housing defining a central cavity and including an external sensor mount;
   a differential case received in the central cavity of the axle housing;
   a differential unit in the differential case, the differential unit including a pair of side gears;
   an axle tube coupled to the axle housing;
   an axle shaft coupled for rotation with one of the side gears, the axle shaft extending through the axle tube;

a bearing supporting the differential case for rotation in the central cavity of the axle housing;

a ring mounted in the axle housing;

a tone ring defining an internal bore through which the axle shaft extends, the tone ring being coupled for rotation with the axle shaft;

a retainer coupled to both the ring and the tone ring to maintain the tone ring at a predetermined axial spacing relative to the ring; and a sensor secured to the sensor mount and sensing the tone ring;

wherein the retainer comprises a set of prong members that are configured to snap-fit with the ring.

13. The axle assembly of claim 12, wherein the retainer comprises a second set of prong members and wherein the ring comprises a plurality of cut-outs that are configured to accept the second set of prong members.

* * * * *